United States Patent [19]

Metabi

[11] Patent Number: 4,682,871

[45] Date of Patent: Jul. 28, 1987

[54] APERTURE VALUE INFORMATION SWITCHABLE LENS BARREL

[75] Inventor: Tsuneyo Metabi, Izumi, Japan

[73] Assignee: Minolta Camera Kabushiki Kaisha, Osaka, Japan

[21] Appl. No.: 902,886

[22] Filed: Sep. 2, 1986

[30] Foreign Application Priority Data

Sep. 2, 1985 [JP] Japan ................................ 60-194154

[51] Int. Cl.$^4$ ........................ G03B 7/091; G03B 17/00
[52] U.S. Cl. .................................... 354/400; 354/410; 354/465; 354/485; 354/195.11; 354/286
[58] Field of Search ................ 354/400, 410, 441, 442, 354/465, 471, 455, 485, 195.1, 195.11, 286, 289.1, 289.12, 270, 271.1, 273, 421, 412

[56] References Cited

U.S. PATENT DOCUMENTS

| | | | |
|---|---|---|---|
| 4,141,636 | 2/1979 | Shimojima | 354/195.11 |
| 4,416,526 | 11/1983 | Tomori et al. | 354/286 |
| 4,560,267 | 12/1985 | Nakai et al. | 354/286 X |
| 4,596,454 | 6/1986 | Kawai et al. | 354/286 |
| 4,637,704 | 1/1987 | Ishimura et al. | 354/286 |

Primary Examiner—W. B. Perkey
Attorney, Agent, or Firm—Watson Cole Grindle & Watson

[57] ABSTRACT

A camera having an aperture value information switchable lens assembly or lens barrel, comprising an information output device provided in the lens assembly for generating lens information. The information output device includes a first information unit for generating nominal aperture value information inherently stored therein, and a second information unit for generating effective aperture value information variable with image magnification. The camera further comprises an information selecting device provided in the lens assembly and connected to the information output device for selecting between the nominal aperture value information and the effective aperture value information, a focusing setting device connected to the information output device, an information transmitting device for transmitting information selected by the information selecting device to a main camera body, and a multifunction electrical circuit mounted in the main camera body for transmitting a control signal to the information output device and processing the lens information received from the information output device.

24 Claims, 7 Drawing Figures

APERTURE VALUE INFORMATION SWITCHABLE LENS BARREL

BACKGROUND OF THE INVENTION

1. Field of the invention

The present invention relates to a lens barrel of a camera having information means capable of generating aperture value information.

2. Description of the Prior Art

With the lens barrel of a camera, a full aperture value and a minimum aperture value are inherently set and intermediate aperture values are available for selection. Such aperture values, or F-numbers, generally are arranged in a specific order for selection as, for example, F2, 2.8, 4, 5.6 and so on, with intermediate values thereof.

The above aperture values are variable with image magnification even when an aperture diameter is fixed. Therefore, even if the aperture value is set to F4 (hereinafter referred to as nominal F-number Fo) for example, an actual aperture value (hereinafter referred to as effective F-number Fe) changes as $Fe = Fo*(1+\beta)$ when image magnification $\beta$ is changed by a change in camera-to-subject distance. Generally, an ordinary lens barrel has image magnifications $\beta$ not exceeding 1/10, in which case the effective F-number is variable within a small range. However, a lens barrel for closeup photography which is sometimes called macro or micro lens has image magnifications of about ½ to 1/1, in which case the effective F-number is variable to a great extent to deviate significantly from the nominal F-number. Although proper exposure is achieved if an amount of exposure is determined by TTL metering, improper exposure will result from an exposure control based on the nominal F-number when using a peripheral or external exposure meter or an electronic flash unit of the external metering type. For the latter case, therefore, it is desirable to employ the effective F-number.

On the other hand, the effective F-number assumes various numerical values since it is variable in a continuous manner according to image magnification. Therefore, it is extremely troublesome to read out such numerical values. For comparing aperture values or for determining an amount of stop down from the full aperture value, indications are given by step numbers according to the arranged order mentioned hereinabove. It is, however, extremely difficult to provide such indications when the effective F-number or aperture value is used.

In the case of nominal F-numbers it is easy to provide indications by step numbers since they are arranged in the above-mentioned order. Furthermore, the nominal F-numbers used are restricted to certain specific numbers and have been in common use, wherefore the nominal F-numbers are easy for the photographer to understand.

Additionally, it is sufficient to use the nominal F-number, even when the macro or micro lens is used for taking a normal photography.

Thus, the nominal F-number and effective F-number have their own merits and demerits, and either one cannot meet all of the photographing conditions. This has been very inconvenient to the photographer.

SUMMARY OF THE INVENTION

Having regard to the disadvantage of the prior art as noted above, the object of the present invention is to provide a lens barrel and a camera system utilizing such a lens barrel that is adapted to readily utilize aperture value information for all photographing conditions.

In order to achieve this object, a lens barrel according to the present invention comprises information means for generating lens information, the information means including a first information unit for generating nominal aperture value information inherently stored therein, and a second information unit for generating effective aperture value information variable with image magnification, information selecting means connected to the information means for selecting between the nominal aperture value information and the effective aperture value information, and information transmitting means for transmitting information selected by the information selecting means outwardly of the lens barrel.

Furthermore, a camera system employing this lens barrel comprises a multifunction electrical circuit means for sending a control signal to the information means and for processing lens information received from the information means.

The above construction permits the camera body to receive information selected from the effective aperture value information and the nominal aperture value information by operating the information selecting means. The information thus selected is used for exposure calculation at the multifunction electrical circuit means, and results of the calculation are applied to exposure control of the camera or are indicated to the photographer. Consequently, the most desirable aperture value information may be employed as the photographer wishes, thereby making good use of the advantages of the effective aperture value information and nominal aperture value information, respectively.

The above and other objects and features of the present invention will become apparent from the following description taken in conjunction with the preferred embodiment thereof with reference to the accompanying drawings.

DESCRIPTION OF THE PREFERRED EMBODIMENT

Figure 2:
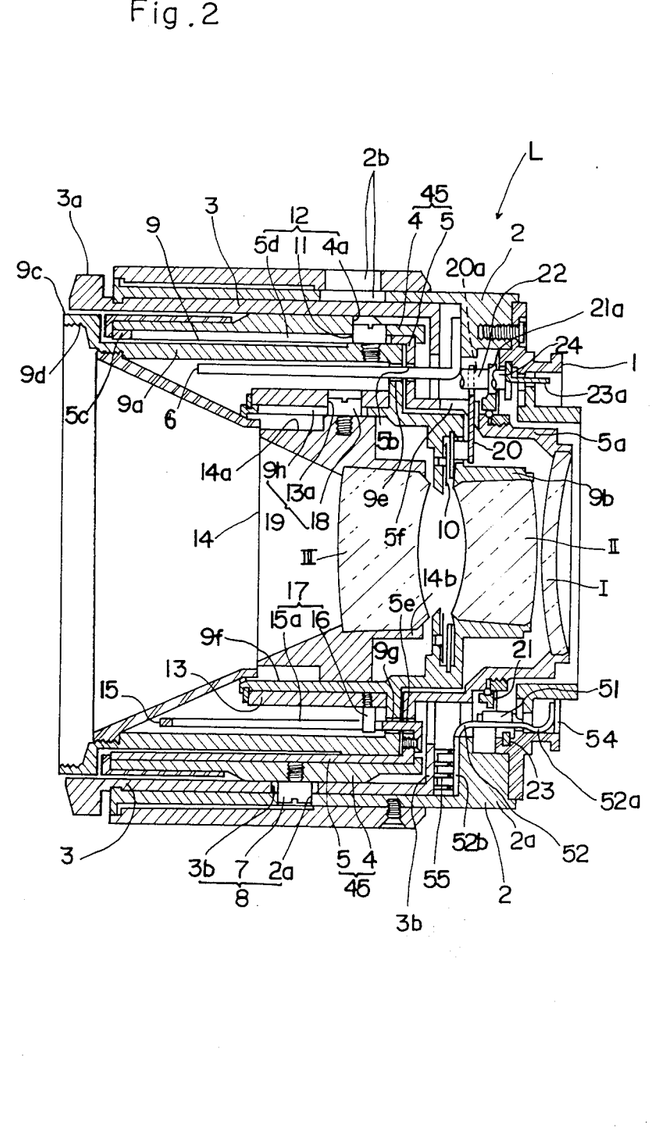
FIG. 2 is a sectional view of an interchangeable lens according to the above embodiment.

Referring first to FIG. 2, the present invention is embodied into an interchangeable lens assembly L such as a macro or micro lens having a mount 1 at a rear end thereof for attachment to a camera body. The lens assembly L comprises an extendible floating lens system including three lens units I, II and III. The mount 1 is secured to a rear of a stational barrel 2 containing a focusing ring 3 fitted to an inner peripheral wall thereof to be only rotatable relative to the stational barrel 2. The focusing ring 3 defines a control portion 3a exposed from a forward end of the stational barrel 2.

A first movable frame 45 supporting the lens unit I is mounted on an inner peripheral wall of the focusing ring 3. The first movable frame 45 comprises a combination of an outer barrel 4 fitted to the inner peripheral wall of the focusing ring 3 to be rotatable as well as movable along an optical axis and an inner barrel 5 fitted to an inner peripheral wall of the outer barrel 4 to be only rotatable. The inner barrel 5 has a small diameter portion 5a extending rearwardly out of the outer barrel 4 and supporting the lens unit I. Further, the inner barrel 5 defines a bore 5b in engagement with a straight key 6 extending from the stational barrel 2.

The outer barrel 4 carries guide pins 7 screwed to and projecting from an outer peripheral wall thereof at three positions equidistant to one another in the circumferential direction. Each of the guide pins 7 is in engagement with a cam groove 3a defined in the focusing ring 3 and with a cam groove 2a defined in the stational barrel 2. These guide pins 7, cam grooves 3b and cam grooves 2a constitute a first drive mechanism 8 operable, in response to a rotation of the focusing ring 3 relative to the stational barrel 2, to move the first movable frame 45 along the key 6 in the direction of the optical axis while rotating the outer barrel 4.

The inner barrel 5 has a large diameter portion 5c containing a second movable frame 9. The second movable frame 9 is fitted at a rear end of a forward, large diameter portion thereof to an inner peripheral wall of the large diameter portion 5c of the inner barrel 5 to be rotatable as well as movable along the optical axis. The second movable frame 9 has a rear, small diameter portion 9b supporting the lens unit II and an aperture diaphragm 10 in front of the lens unit II.

The second movable frame 9 carries guide pins 11 screwed to and projecting from an outer peripheral wall of a fitting portion thereof with respect to the inner barrel 5, at three positions equidistant to one another in the circumferential direction. Each of the guide pins 11 is in engagement with a straight groove 5d defined in the inner barrel 5 to extend in the direction of the optical axis and with a cam groove 4a defined in the outer barrel 4. These guide pins 11, straight grooves 5d and cam grooves 4a constitute a second drive mechanism 12 operable, in response to the rotation of the outer barrel 4 relative to the inner barrel 5 of the first movable frame 45, to move the second movable frame 9 relative to the inner barrel 5 in the direction of the optical axis.

The second movable frame 9 has an annular lens head portion 9c opposed to a forward end of the first movable frame 45 and defining screws 9d in an inner peripheral wall thereof for attaching an accessory. Further, the second movable frame 9 defines a through bore 9e for receiving the straight key 6 so as to avoid contact with the straight key 6 when the second movable frame 9 assumes rearward positions along the optical axis.

An auxiliary inner barrel 9f is defined inside the large diameter portion 9a of the second movable frame 9. A cam ring 13 is fitted on an outer peripheral wall of this auxiliary inner barrel 9f to be only rotatable, and a third movable frame 14 is fitted at a rear end of a forward, large diameter portion 14a thereof to an inner peripheral wall of the auxiliary inner barrel 9f to be rotatable as well as movable in the direction of the optical axis. The third movable frame 14 suppports the lens unit III at a rear end of a rear, small diameter portion 14b thereof.

The inner barrel 5 carries, fixed to the rear end thereof, a cam plate 15 extending in the direction of the optical axis through bores 5e and 9g of the inner barrel 5 and the second movable frame 9 and into a space between the large diameter portion 9a of the second movable frame 9 and the auxiliary inner barrel 9f. The cam plate 15 defines a cam groove 15a for receiving a guide pin 16 screwed to and projecting from an outer peripheral wall of the cam ring 13. These cam groove 15a and guide pin 16 constitute a rotary mechanism 17 for rotating the cam ring 13 in response to a relative rotation between the second movable frame 9 and the inner barrel 5 of the first movable frame 45 resulting from a difference therebetween in amount of movement in the direction of the optical axis.

The third movable frame 14 carries guide pins 18 screwed to and projecting from an outer peripheral wall of a fitting portion thereof with respect to the auxiliary inner barrel 9f, at three positions equidistant to one another in the circumferential direction. Each of the guide pins 18 is in engagement with a straight groove 9h defined in the auxiliary inner barrel 9f to extend in the direction of the optical axis and with a cam groove 13a defined in the cam ring 13. These guide pins 18, straight grooves 9h and cam grooves 13a constitute a third drive mechanism 19 operable, in response to the rotation of the cam ring 13 relative to the second movable frame 9, to move the third movable frame 14 relative to the second movable frame 9 in the direction of the optical axis.

The aperture diaphragm 10 has a driven plate 20 disposed outwardly of the small diameter portion 9b of the second movable frame 9. The driven plate 20 defines a bifurcate driven end 20a projecting outwardly of the small diameter portion 5a of the inner barrel 5 of the first movable frame 45 through a bore 5f defined in the small diameter portion 5a. A diaphragm operating ring 21 is rotatably mounted on an outer peripheral wall of the small diameter portion 5a and carries an operating pin 22 engaging the bifurcate driven end 20a for driving the driven plate 20. A preset ring 23 is rotatably mounted in the mount 1 of the stational barrel 2, and carries an operating pin 24 engaging a cutout 21a defined in an outer peripheral wall of the diaphragm operating ring 21 for driving the latter. The preset ring 23 further carries a driven piece 23a extending rearwardly along an inner peripheral wall of the mount 1. The driven piece 23a is positionally adjustable by an automatic aperture control mechanism mounted in the camera body, whereby the aperture diaphragm 10 is set to a selected aperture value (F-number) through the operating ring 21 and driven plate 20.

Though not shown, driven gear teeth are defined in a rear inner peripheral wall of the focusing ring 3 and a follower shaft for autofocusing is provided in the rear end of the stational barrel 2 with a coupler projecting rearwardly from the mount 1. The driven gear teeth and a gear defined on the follower shaft are operatively connected to each other through an intermediate shaft supported in the rear portion of the stational barrel 2.

Furthermore, a window 2b is defined in a portion of the stational barrel 2 to enable reading from outside of a distance scale, not shown, provided on an outer peripheral wall at a rear portion of the focusing ring 3.

FIG. 2 to which referece has been made hereinbefore shows an infinity photographing position whereas FIG.

Figure 3:
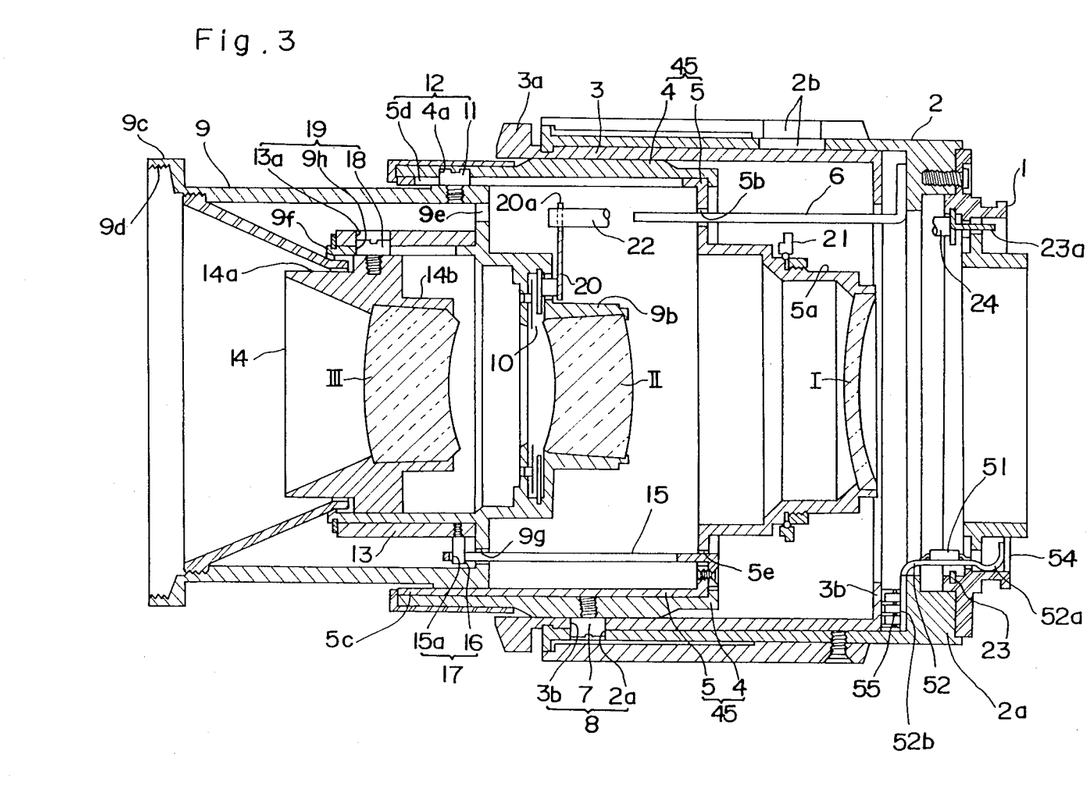
FIG. 3 is a sectional view of the interchangeable lens in an extended position.

3 shows a closest photographing position with the lens system extended to a maximum.

How the foregoing embodiment operates will be described now. The focusing ring 3 is rotatable relative to the stational barrel 2 either by a manual operation of its control portion 3a or by an autofocusing mechanism mounted in the camera body which drives the above-mentioned follower shaft, not shown, and the driven gear, not shown.

The rotation of the focusing ring 3 causes the first drive mechanism 8 to rotate the outer barrel 4 of the first movable frame 45 and move the outer barrel 4 along the optical axis at the same time. Since the inner barrel 5 is held against rotation by the straight key 6 at this time, the inner barrel 5 moves only in the direction of the optical axis without rotating with the outer barrel 4, moving the lens unit I only in the direction of the optical axis by an amount corresponding to an amount of rotation of the focusing ring 3.

At the same time, the relative rotational slipping between the outer barrel 4 and inner barrel 5 of the first movable frame 45 causes the second drive mechanism 12 to move the second movable frame 9 along the optical axis and relative to the first movable frame 45. A sum of the movement along the optical axis of the first movable frame 45 and the movement along the optical axis of the second movable frame 9 relative to the first movable frame 45 results in a movement along the optical axis of the second movable frame 9, and of the lens unit II, relative to the stational barrel 2 by a predetermined amount corresponding to the amount of rotation of the focusing ring 3.

The relative movement along the optical axis of the second movable frame 9 and the first movable frame 45 causes the rotary mechanism 17 to rotate the cam ring 13 relative to the second movable frame 9. The rotation of the cam ring 13 causes the third drive mechanism 19 to move the third movable frame 14 along the optical axis relative to the second movable frame 9. A sum of the movement along the optical axis of the second movable frame 9 (which is the sum of the movement along the optical axis of the first movable frame 45 and the movement along the optical axis of the second movable frame 9 relative to the first movable frame 45) and the movement along the optical axis of the third movable frame 14 relative to the second movable frame 9 results in a movement along the optical axis of the third movable frame 14, and of the lens unit III, relative to the stational barrel 2 by a predetermined amount corresponding to the amount of rotation of the focusing ring 3.

The foregoing operation achieves focusing as a result of the respective movements along the optical axis of the lens units I, II and III corresponding to the amount of rotation of the focusing ring 3.

Figure 1:
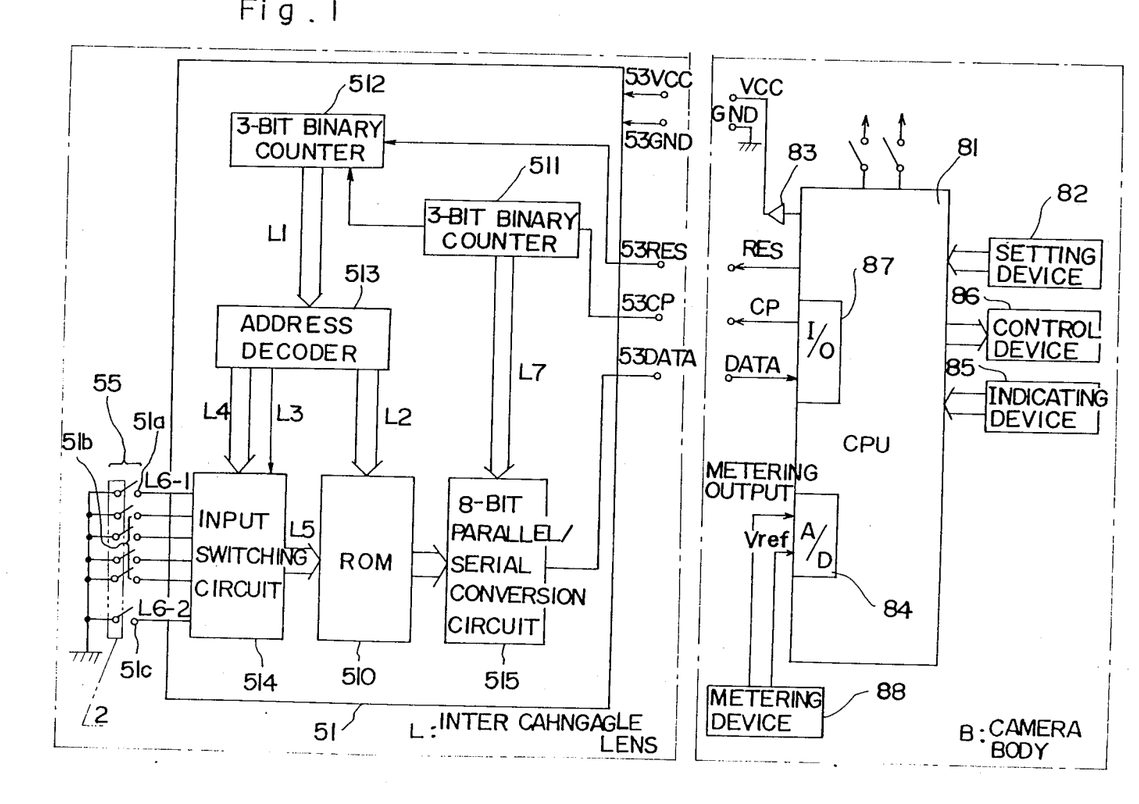
FIG. 1 is an explanatory view of information transmission according to one embodiment of the present invention.

The information transmission between the camera body and the interchangeable lens assembly will be described hereinafter with reference to FIG. 1.

The interchangeable lens assembly L is provided with a ROM-IC 51 for generating various types of information relating to the lens to a CPU 81 mounted in the camera body B. ROM-IC 51 is mounted on an insulating flexible printed wiring board 52 formed of a synthetic resin material (FIGS. 2 and 3) which is attached circumferentially to a front face of the rear portion 2a of the stational barrel 2. As shown in FIGS. 1, 2, 3, 6 and 7, the board 52 has one piece 52a extending from ROM-IC 51 rearwardly of the interchangeable lens L and including electric signal lines 53 VCC for getting supply of power from the camera body, 53 GND, 53 RES, 53 CP and 53 DATA for exchanging signals with the camera body. Furthermore, as shown in FIGS. 1 through 5, the board 52 has another piece 52b extending in a circumferential direction from ROM-IC 51 and including a grounding encoder contact 51a, a full aperture F-number deviation encoder contact 51b, and an F-number switching encoder contact 51c.

The piece 52a of the board 52 extends through a cutout formed in the direction of the optical axis in the inner peripheral wall of the stational barrel 2 and reaches a connector board 54 attached to the inner peripheral wall of the lens mount 1. The electric signal lines 53 VCC, 53 GND, 53 RES, 53 CP and 53 DATA are connected to the respective terminals 54a–54e on the connector board 54. As shown in FIGS. 2 through 5, the focusing ring 3 includes a flange 3b opposed to the encoder contacts 51a, 51b and 51c, and a full aperture F-number deviation encoder brush 55 is calked to the flange 3b for contact with the encoder contacts 51a, 51b and 51c in order to connect the encoder contacts 51a, 51b and 51c in various ways according to operating conditions of the interchangeable lens assembly L.

Figure 4:
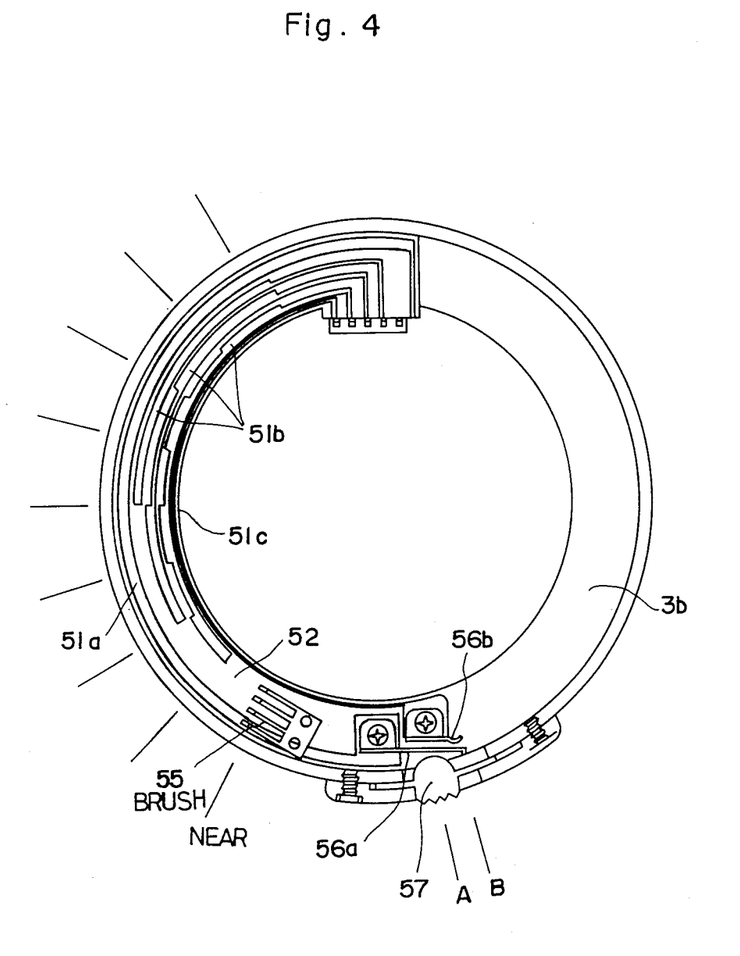
FIG. 4 is a sectional view of the above embodiment.
Figure 5:
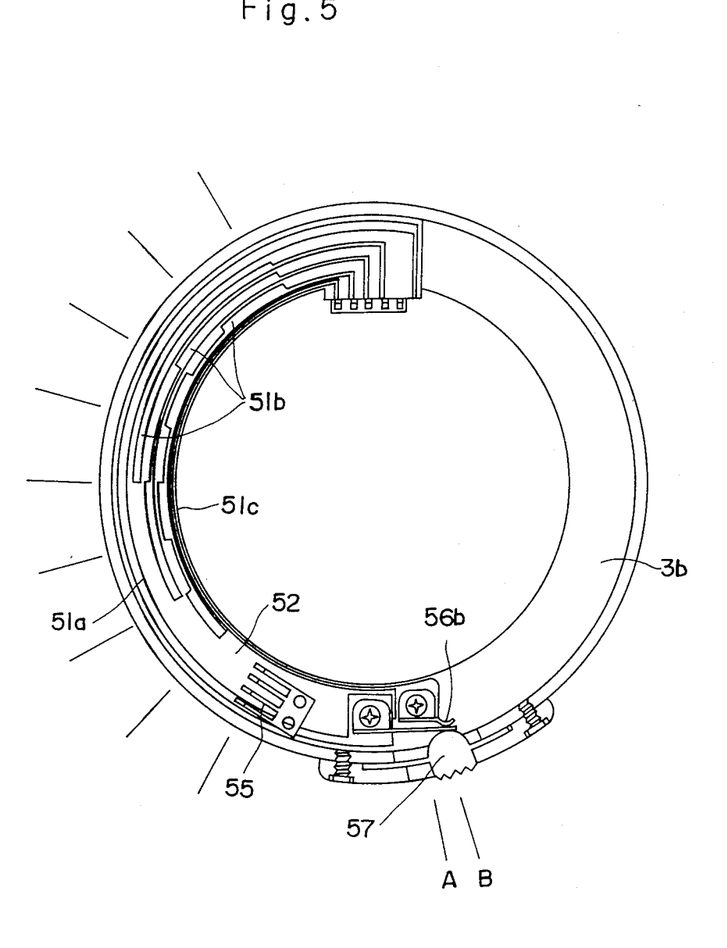
FIG. 5 is a sectional view of the above embodiment in a different state.
Figure 6:
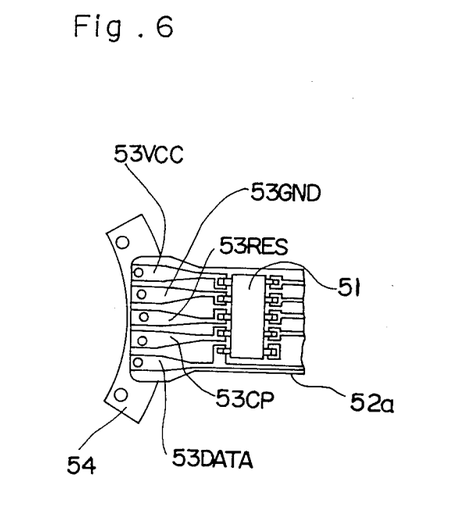
FIG. 6 is a plan view of a principal portion of the above embodiment.
Figure 7:
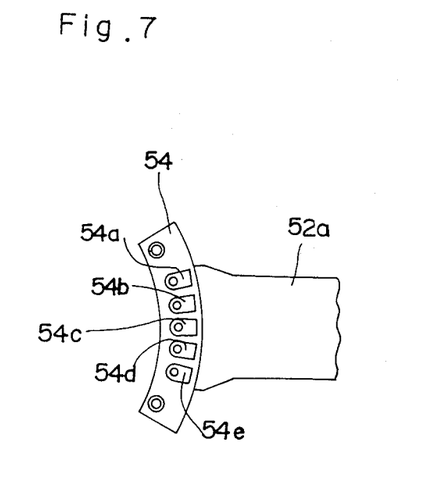
FIG. 7 is a rear view of the principal portion shown in FIG. 6.

As shown in FIGS. 4 and 5, a switch contact 56a is attached to the grounding encoder contact 51a, and a switch contact 56b is attached to the F-number switching encoder contact 51c. On the other hand, the stational barrel 2 includes a switch button 57 movable in the circumferential direction thereof to place the switch contacts 56a and 56b into and out of engagement with each other whereby the grounding encoder contact 51a and the F-number switching encoder contact 51c are electrically connected to and disconnected from each other. When the two encoder contacts are disconnected (FIG. 4), deviation information on nominal F-numbers is produced. When the two encoder contacts are connected (FIG. 5), deviation information on effective aperture values is produced.

ROM-IC 51 stores in its ROM 510 various types of information inherent to the interchangeable lens assembly L such as the full aperture F-number, maximum F-number, focal length information, and information relating to the operating direction for the focusing ring 3 with respect to variation in the distance to a photographed object.

ROM 510 further stores attachment check codes which are first read out by the CPU 81 in the camera body B. When a normal code such as "10101010" is read out, the interchangeable lens assembly L is judged to be properly attached to the camera body and the various types of information noted above are made valid. When the normal code is not read out, the lens assembly L is judged to be improperly attached and the various types of information are made invalid.

The full aperture F-number and maximum F-number are converted by a known FNO-AV converting equation, $AV = 2 \times \text{Log}^2 \text{FNO}$, and are then stored in a $\frac{1}{8}$ EV unit in the ROM 510. Where FNO=1.68 for example, $AV=1+4/8$, and thus "00001100" is stored. Where FNO=32, $AV=10+0/8$, and thus "01010000" is stored.

The full aperture F-number deviation is, as are the full aperture F-number and maximum F-number, stored in the $\frac{1}{8}$ EV unit in the ROM 510. Where exposure control is effected according to the nominal F-number information, the switch button 57 is placed at an A position as illustrated in FIG. 4 whereupon the grounding encoder contact 51a and the F-number switching encoder contact 51c are disconnected from each other, each address from infinity photography to closeup photography is designated, and the data of full aperture F-number deviation AVo=0 and full aperture F-number data AVo are transmitted from the ROM to the camera body. In the case of metering with a peripheral meter, the switch button 57 is placed in a position B as illustrated in FIG. 5 whereupon the contacts 51a and 51b are electrically connected to each other, and each address from infinity photography to closeup photography which is different from the above-mentioned address is designated. Since image magnification changes over a range from the infinity photography to the closeup photography, thereby changing the effective F-number FNOeff as FNOeff=$(1+\beta)\times$(nominal F-number), the data $(1+\beta)=\Delta AVo$ according to each image magnification is stored in each address. The information on full aperture effective F-number is derived from the data of full aperture F-number AVo and the $\Delta AVo$ data. When the camera is set to F-number Avs designated by the peripheral meter, the driven piece 23a takes a diaphragm control stroke corresponding to $AVs-(AVo+\Delta AVo)$, thereby realizing the exposure indicated by the meter.

The construction of CPU 81 and ROM-IC 51 will be described in greater detail now. The CPU 81 is initialized by a setter 82 when a power source switch, not shown, mounted on the camera body B is turned on. When a metering switch, not shown, is turned on after the initialization, a sequence starts for reading out the data of the lens assembly L attached to the camera body B. This data readout sequence first begins a supply of Vcc voltage to the ROM-IC 51 of the lens assembly L through a buffer 83. After the power supply has begun, a reset signal RES is changed from "Low" to "High" thereby to reset the ROM-IC 51. After this resetting operation the CPU 81 generated clock pulses CP to a first 3-bit binary counter 511 of the ROM-IC 51. The first 3-bit binary counter 511 sends a single pulse per eight clock pulses CP received, to a next, second 3-bit binary counter 512. The second 3-bit binary counter 512 sequentially generates signals L1 according to the pulses received from the first 3-bit binary counter 511, and sends the signals L1 to an address decoder 513. The relationship between input and output of the second 3-bit binary counter 512 is shown in Table 2.

TABLE 1

| Input pulses | Output L1 | Input pulses | Output L1 |
|---|---|---|---|
| 1 | 000 | 4 | 011 |
| 2 | 001 | 5 | 100 |
| 3 | 010 | 6 | 101 |

In response to the signals L1, the address decoder 513 generates signals L2 and L4 for designating the address in the ROM 510. The signal L2 is for designating upper three bits of the 8-bit address, and the signal L4 is for designating the lower five bits. The lower five bits may be designated also by peripheral signals L6-1 from the grounding encoder contact 51a and full aperture F-number deviation encoder contact 51b and peripheral signals L6-2 from the F-number switching encoder contact 51c.

The switching between the signals L4 and L6 for designating the lower five bits of the address is effecting in an input switching circuit 514 in response to an output L3 of the address decoder 513. As a result a signal L5 is generated by the input switching circuit 514 for finally designating the lower five bits of the address in the ROM 510.

The relationship among inputs and outputs L1, ..., L5, L6-1 and L6-2 of these address decoder 513 and input switching circuit 514 is shown in Table 3.

TABLE 2

| L1 | L2 | L3 | L4 | L6-1 | L6-2 | L5 |
|---|---|---|---|---|---|---|
| 000 | 000 | 00 | 00000 | $a_4\ a_3\ a_2\ a_1$ | $a_0$ | 0 0 0 0 0 |
| 001 | 001 | 00 | 00001 | $a_4\ a_3\ a_2\ a_1$ | $a_0$ | 0 0 0 0 1 |
| 010 | 010 | 00 | 00010 | $a_4\ a_3\ a_2\ a_1$ | $a_0$ | 0 0 0 1 0 |
| 011 | 000 | 00 | 00011 | $a_4\ a_3\ a_2\ a_1$ | $a_0$ | 0 0 0 1 1 |
| 100 | 000 | 00 | 00100 | $a_4\ a_3\ a_2\ a_1$ | $a_0$ | 0 0 1 0 0 |
| 101 | 011 | 01 | 00101 | $a_4\ a_3\ a_2\ a_1$ | $a_0$ | $a_4\ a_3\ a_2\ a_1\ a_0$ |

In the above table, $a_4$, $a_3$, $a_2$, $a_1$ and $a_0$ are "0" or "1". - "0" when contacts 51b and 51c are electrically connected to contact 51a and "1" when contacts 51b and 51c are disconnected from contact 51a.

According to Table 2, if L3="00", L5=L4, and, if L3="01", L5=L6-1, L6-2, and each address is designated by the above values.

Table 3 shows the relationship between the types of data in the ROM 510 and the addresses.

TABLE 3

| L1 | upper 3 bits L2 | lower 5 bits L5 | written information |
|---|---|---|---|
| 000 | 000 | 0 0 0 0 0 | attachment check code |
| 001 | 001 | 0 0 0 1 0 | full aperture F-No. |
| 010 | 010 | 0 0 0 1 1 | maximum F-No. |
| 011 | 000 | 0 0 0 1 1 | focal length |
| 100 | 000 | 0 0 1 0 0 | operating direction |
| 101 | 011 | $a_4\ a_3\ a_2\ a_1\ a_0$ | full aperture F-No. deviation |

When the lowermost bit of the address L6-2 is "1", namely when the contacts 56a and 56b are off, the full aperture F-number deviation information is $\Delta AVo=0$ regardless of the object distance. When the lowermost bit of the address L6-2 is "0", namely when the contacts 56a and 56b are on, the data of $\Delta AVo$ which change with magnification at the time of lens shift from an infinity position to a closeup position are stored in the ROM 510. Table 5 shows these data.

TABLE 4

| | L2 | | | L6-1 | | | L-62 | | data | | | | |
|---|---|---|---|---|---|---|---|---|---|---|---|---|---|
| nom. F-No. | 0 | 1 | 1 | 1 | 0 | 0 | 0 | 1 | $\Delta AVo=0$ | 0 | 0 | 0 | 0 | 0 |
| | 0 | 1 | 1 | 1 | 0 | 0 | 1 | 1 | | 0 | 0 | 0 | 0 | 0 |
| | 0 | 1 | 1 | 1 | 0 | 1 | 0 | 1 | | 0 | 0 | 0 | 0 | 0 |
| | 0 | 1 | 1 | 1 | 0 | 1 | 1 | 1 | | 0 | 0 | 0 | 0 | 0 |
| | 0 | 1 | 1 | 1 | 1 | 0 | 0 | 1 | | 0 | 0 | 0 | 0 | 0 |
| | 0 | 1 | 1 | 1 | 1 | 0 | 1 | 1 | | 0 | 0 | 0 | 0 | 0 |
| | 0 | 1 | 1 | 1 | 1 | 1 | 0 | 1 | | 0 | 0 | 0 | 0 | 0 |
| | 0 | 1 | 1 | 1 | 1 | 1 | 1 | 1 | full aperture F-No. deviation | 0 | 0 | 0 | 0 | 0 |
| Effec. F-No. | 0 | 1 | 1 | 1 | 0 | 0 | 0 | 0 | $\Delta AVo=0$ | 0 | 0 | 0 | 0 | 0 |
| | 0 | 1 | 1 | 1 | 0 | 0 | 1 | 0 | 2/8 | 0 | 0 | 0 | 1 | 0 |
| | 0 | 1 | 1 | 1 | 0 | 1 | 0 | 0 | 4/8 | 0 | 0 | 1 | 0 | 0 |

TABLE 4-continued

| L2 | | | L6-1 | | | L-62 | | | | data | | | |
|---|---|---|---|---|---|---|---|---|---|---|---|---|---|
| 0 | 1 | 1 | 1 | 0 | 1 | 1 | 0 | 6/8 | 0 | 0 | 1 | 1 | 0 |
| 0 | 1 | 1 | 1 | 1 | 0 | 0 | 0 | 10/8 | 0 | 1 | 0 | 0 | 0 |
| 0 | 1 | 1 | 1 | 1 | 0 | 1 | 0 | 12/8 | 0 | 1 | 0 | 1 | 0 |
| 0 | 1 | 1 | 1 | 1 | 1 | 0 | 0 | 14/8 | 0 | 1 | 1 | 0 | 0 |
| 0 | 1 | 1 | 1 | 1 | 1 | 1 | 0 | 16/8 | 0 | 1 | 1 | 1 | 0 |

ROM 510 sends 8-bit data of the address designated by the signals L2 and L5, to an 8-bit parallel/series conversion circuit 515. The 8-bit parallel/series conversion ciruit 515 converts the 8-bit parallel data received from the ROM 510, into 8-bit series data sequentially from the lowermost bit, and its timing is controlled by an output L7 of the first 3-bit binary counter 511.

The logic of conversion from the parallel data to the series data is as shown in Table 6.

TABLE 5

| L7 | | | | 8-bit series data output | | | | | | |
|---|---|---|---|---|---|---|---|---|---|---|
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |
| | | | lowermost bit | | | | | | | uppermost bit |

The data stored in the ROM 510 of the interchangeable lens assembly L are read out in the above order.

The CPU 81 mounted in the camera body B, after receiving through an I/O port 87 the 8-bit series data read out of the ROM 510, reads out a photographing mode and selected AV and TV from the setter 82, and causes a metering member 88 to begin metering. Its metering data is input together with reference voltage Vref to CPU 81 through an A/D converter 84. In CPU 81 the metering data is quantized. An operation relating to exposure is carried out based on the quantized metering value and the full aperture F-number, maximum F-number and full aperture F-number read out of the interchangeable lens assembly L and taking into account the photographing mode provided by the setter 82. Results of the operation are transmitted to a control member 86 while being indicated in a necessary range by an indicating member 85.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A lens barrel comprising;
   information means for generating lens information, said information means including a first information unit for generating nominal aperture value information inherently stored therein, and a second information unit for generating effective aperture value information variable with image magnification,
   information selecting means connected to said information means for selecting between said nominal aperture value information and said effective aperture value information, and
   information transmitting means for transmitting information selected by said information selecting means outwardly of said lens barrel.

2. A lens barrel as claimed in claim 1 further comprising focusing means connected to said information means.

3. A lens barrel as claimed in claim 2 wherein said second information unit is adapted to generate a specific effective aperture value information signal corresponding to a value set by said focusing means.

4. A lens barrel as claimed in claim 1 wherein said information means includes at least one data memory device.

5. A lens barrel as claimed in claim 4 wherein said data memory device comprises a ROM.

6. A lens barrel as claimed in claim 5 further comprising focusing means, and encoder means connected to said focusing means and said information means for encoding a value set by said focusing means.

7. A lens barrel as claimed in claim 6 wherein said encoder means is adapted to generate a signal including an address signal for said ROM.

8. A lens barrel as claimed in claim 7 wherein said encoder means includes a grounding encoder contact (51a), a plurality of full aperture value deviation encoder contacts (51b), an aperture value switching encoder contact (51c), and a full aperture value deviating encoder brush (55) for connecting said full aperture value deviation encoder contacts and said grounding encoder contact according to an amount of extension of the lens barrel.

9. A lens barrel as claimed in claim 8 wherein said information selecting means includes switching means mounted between said grounding encoder contact and said aperture value switching encoder contact, said second information unit providing an output when said switching means is turned on, and said first information unit providing an output when said switching means is turned off.

10. A lens barrel as claimed in claim 9 wherein said switching means is mounted on a lens housing.

11. A lens barrel as claimed in claim 7 wherein said ROM is provided on a flexible printed wiring board mounted in said lens housing.

12. A lens barrel as claimed in claim 11 wherein said flexible printed wiring board includes a first extension (52a) extending in one direction from a ROM carrying portion thereof and a second extension (52b) extending in the other direction from said ROM carrying portion.

13. A lens barrel as claimed in claim 12 wherein said encoder means is provided on said second extension.

14. A lens barrel as claimed in claim 12 wherein said information transmitting means includes at least one electric signal line and a power supply line formed on said first extension.

15. A lens information transmitting system for a camera comprising;

information means provided in a lens assembly for generating lens information, said information means including a first information unit for generating nominal aperture value information inherently stored therein, and a second information unit for generating effective aperture value information variable with image magnification, information selecting means provided in said lens assembly and connected to said information means for selecting between said nominal aperture value information and said effective aperture value information, information transmitting means for transmitting information selected by said information selecting means to a main camera body, and multifunction electrical circuit means mounted in said main camera body for transmitting a control signal to said information means and processing said lens information received from said information means.

16. A system as claimed in claim 15 wherein said information means includes a ROM storing said lens information, a first addressing means for designating said lens information inherently stored in said ROM, a second addressing means for designating said nominal aperture value information and said effective aperture value information, switch means for switching between said first and second addressing means, and output means for transmitting data read out of said ROM to said multifunction electrical circuit means.

17. A system as claimed in claim 16 wherein said output means comprises an 8-bit parallel/series conversion circuit for converting 8-bit parallel data read out of said ROM into 8-bit series data and generating the latter.

18. A system as claimed in claim 17 wherein said multifunction electrical circuit means comprises a microcomputer programmed to transmit a control signal to said information means and to process said lens information received from said information means.

19. A camera having an aperture value information switchable lens assembly, comprising;

information means provided in said lens assembly for generating lens information, said information means including a first information unit for generating nominal aperture value information inherently stored therein, and second information unit for generating effective aperture value information variable with image magnification, information selecting means provided in said lens assembly and connected to said information means for selecting between said nominal aperture value information and said effective aperture value information, focusing means connected to said information means, information transmitting means for transmitting information selected by said information selecting means to a main camera body, and multifunction electrical circuit means mounted in said main camera body for transmitting a control signal to said information means and processing said lens information received from said information means.

20. A camera as claimed in claim 19 wherein said second information unit is adapted to generate a specific effective aperture value information signal corresponding to a value set by said focusing means.

21. A camera as claimed in claim 20 further comprising metering means connected to said multifunction electrical circuit means.

22. A camera as claimed in claim 21 wherein said multifunction electrical circuit means is adapted to receive a signal from said metering means and carries out exposure calculations based on said signal from said metering means and said lens information.

23. A camera as claimed in claim 22 further comprising indicator means for indicating results of said exposure calculations.

24. A camera as claimed in claim 23 further comprising control means connected to said multifunction electrical circuit means for receiving results of said exposure calculations and controlling various mechanisms of the camera.

* * * * *